United States Patent
Raffaelli et al.

(10) Patent No.: US 12,454,326 B2
(45) Date of Patent: Oct. 28, 2025

(54) SADDLE-RIDING TYPE VEHICLE WITH A SIMPLIFIED BATTERY REMOVAL SYSTEM

(71) Applicant: Piaggio & C. S.p.A., Pontedera (IT)

(72) Inventors: Andrea Raffaelli, Pontedera (IT); Stefano Bartolozzi, Pontedera (IT); Valentino Mariotti, Pontedera (IT)

(73) Assignee: Piaggio & C. S.p.A., Pontedera (IT)

( * ) Notice: Subject to any disclaimer, the term of this patent is extended or adjusted under 35 U.S.C. 154(b) by 285 days.

(21) Appl. No.: 18/270,862

(22) PCT Filed: Jan. 26, 2022

(86) PCT No.: PCT/IB2022/050681
§ 371 (c)(1),
(2) Date: Jul. 4, 2023

(87) PCT Pub. No.: WO2022/167898
PCT Pub. Date: Aug. 11, 2022

(65) Prior Publication Data
US 2024/0067293 A1 Feb. 29, 2024

(30) Foreign Application Priority Data
Feb. 3, 2021 (IT) .......................... 102021000002375

(51) Int. Cl.
*B62J 43/16* (2020.01)
*B60K 1/04* (2019.01)
(Continued)

(52) U.S. Cl.
CPC ................. *B62J 43/16* (2020.02); *B60K 1/04* (2013.01); *B62J 43/20* (2020.02); *B62J 43/23* (2020.02);
(Continued)

(58) Field of Classification Search
CPC .... B60K 2001/0461; B60K 2001/0488; B60K 1/04; B62J 43/16; B62J 43/20; B62J 43/23
See application file for complete search history.

(56) References Cited

U.S. PATENT DOCUMENTS 1,621,324 A * 3/1927 Hughes ................ A47B 17/036
312/272
3,799,063 A * 3/1974 Reed ....................... B60L 50/66
104/34
(Continued)

FOREIGN PATENT DOCUMENTS

CN 111232105 A 6/2020
CN 115503860 A * 12/2022 .............. B62M 6/90
(Continued)

OTHER PUBLICATIONS

International Search Report, corresponding application No. PCT/IB2022/050681, Apr. 29, 2022, 5 pages.

*Primary Examiner* — Emma K Frick
(74) *Attorney, Agent, or Firm* — Stetina Garred Brucker & Newboles

(57) ABSTRACT

A saddle-riding type vehicle comprises a frame extending mainly along a longitudinal direction and comprising front, central, and rear portions. The vehicle comprises a powertrain connected to the frame and comprising at least one electric motor operatively connected to at least one driving wheel. The vehicle also comprises an electrical power supply assembly for powering the electric motor to allow the traction of the vehicle and comprising at least one first pair of batteries arranged on opposite sides with respect to a longitudinal center plane of the vehicle, orthogonal to the axis of rotation of the at least one driving wheel. Each battery is supported by a corresponding support movable between retracted and extended positions, each support (Continued)

being operatively connected to moving means which releases and/or causes the rotation of the support itself around a corresponding axis of rotation to allow the supports to reach the extracted position.

15 Claims, 13 Drawing Sheets

(51) Int. Cl.
    *B62J 43/20*     (2020.01)
    *B62J 43/23*     (2020.01)
    *B62J 43/28*     (2020.01)
    *B62K 5/027*     (2013.01)

(52) U.S. Cl.
    CPC .............. *B62J 43/28* (2020.02); *B62K 5/027* (2013.01); *B60K 2001/0461* (2013.01); *B60K 2001/0488* (2013.01); *B62K 2204/00* (2013.01)

(56) References Cited

U.S. PATENT DOCUMENTS

| | | | |
|---|---|---|---|
| 8,881,857 B2* | 11/2014 | Binggeli | B62M 6/90 |
| | | | 180/68.5 |
| 9,455,428 B2* | 9/2016 | Kawatani | H01M 50/249 |
| 10,549,729 B2* | 2/2020 | Moskowitz | B60K 1/04 |
| 11,148,516 B2* | 10/2021 | Ogawa | B62K 11/10 |
| 11,355,812 B2* | 6/2022 | Okubo | H01M 50/244 |
| 11,400,994 B2* | 8/2022 | Okabe | H01M 50/207 |
| 11,479,317 B2* | 10/2022 | Sato | H01M 50/543 |
| 11,613,172 B2* | 3/2023 | Yun | H01M 10/425 |
| | | | 180/68.5 |
| 2011/0133417 A1* | 6/2011 | Rouillard | B62B 3/02 |
| | | | 280/638 |
| 2023/0097080 A1* | 3/2023 | Zelioli | B62J 43/20 |
| | | | 180/220 |

FOREIGN PATENT DOCUMENTS

| | | | | |
|---|---|---|---|---|
| CN | 116118470 A | * | 5/2023 | B60K 1/04 |
| CN | 119218344 A | * | 12/2024 | B62K 11/00 |
| DE | 102013205120 A1 | * | 9/2013 | B60L 50/66 |
| KR | 100621910 B1 | * | 9/2006 | B60R 16/04 |
| WO | WO-2008072043 A1 | * | 6/2008 | B62M 7/00 |
| WO | 2018178837 A1 | | 10/2018 | |
| WO | WO-2019064601 A1 | * | 4/2019 | B62M 7/06 |
| WO | WO-2022200892 A1 | * | 9/2022 | B62J 43/16 |

* cited by examiner

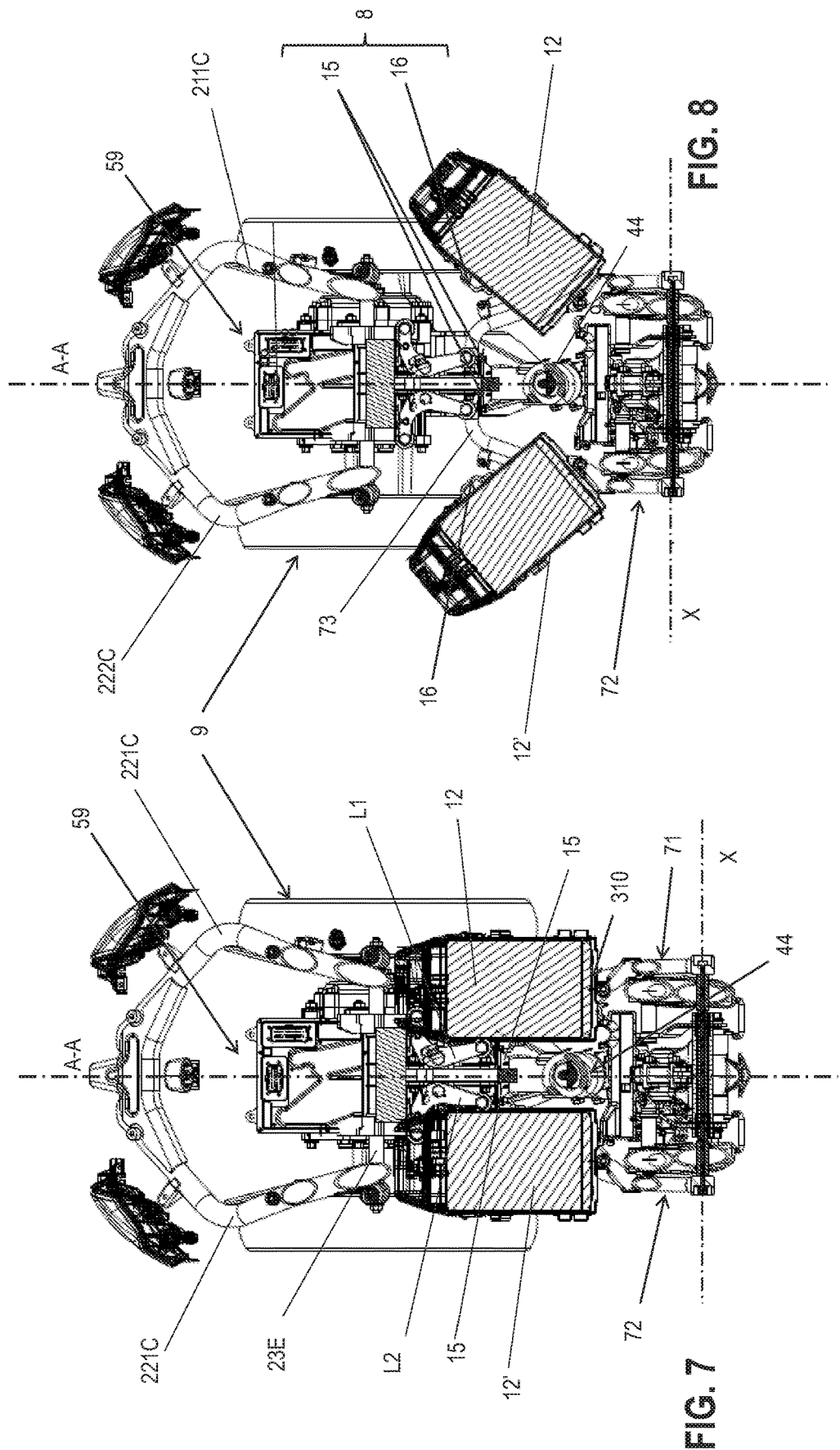

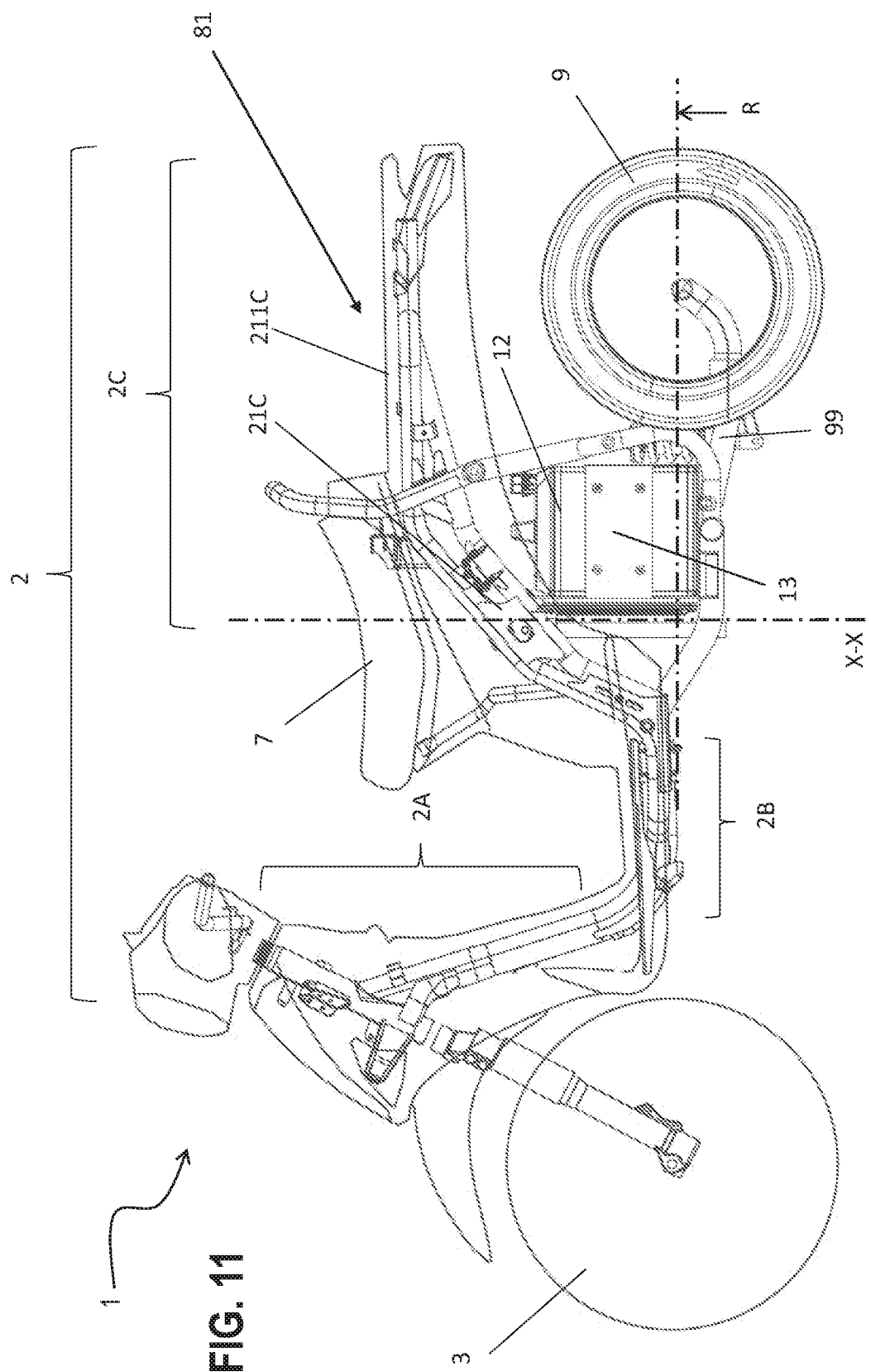

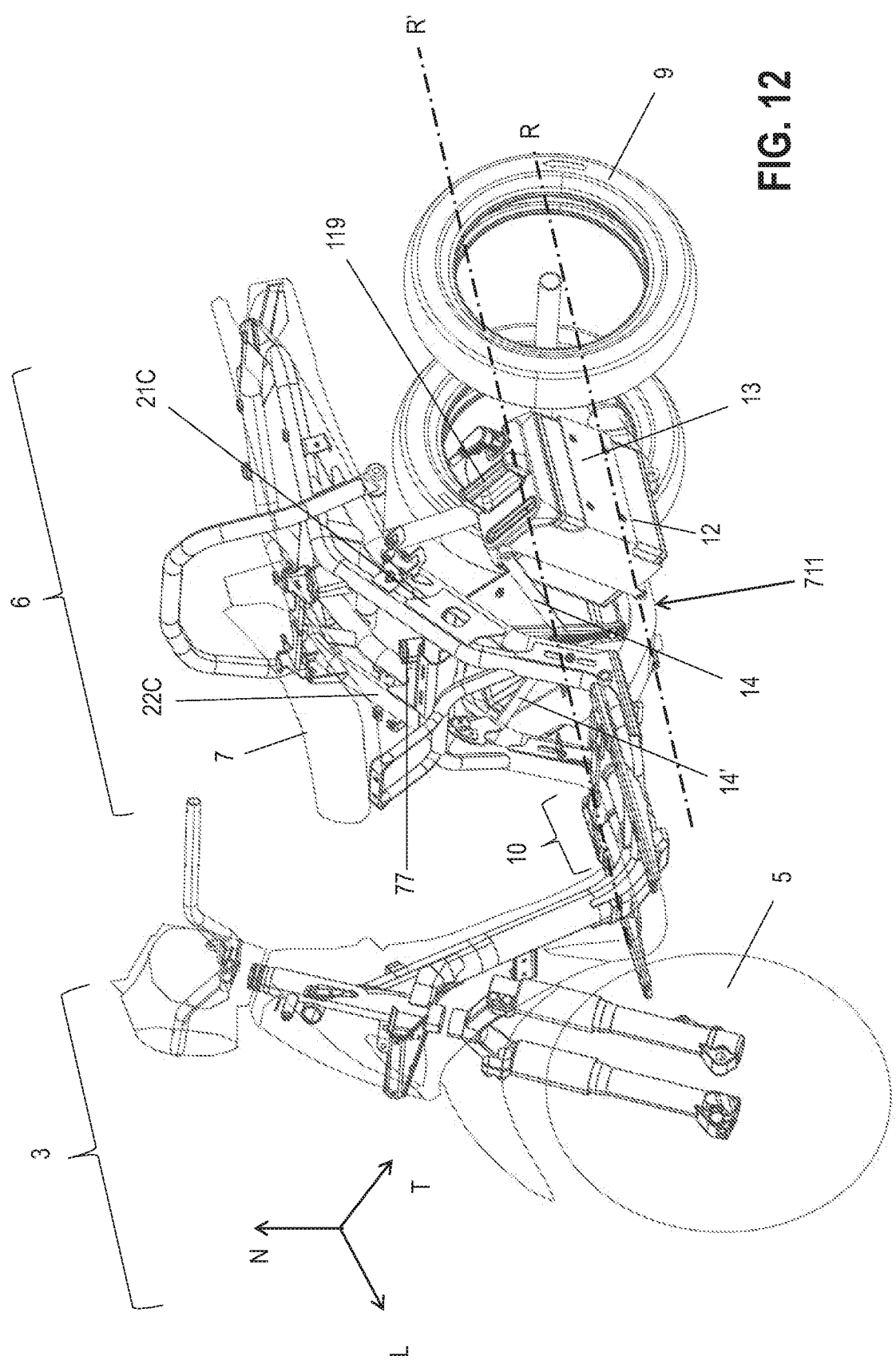

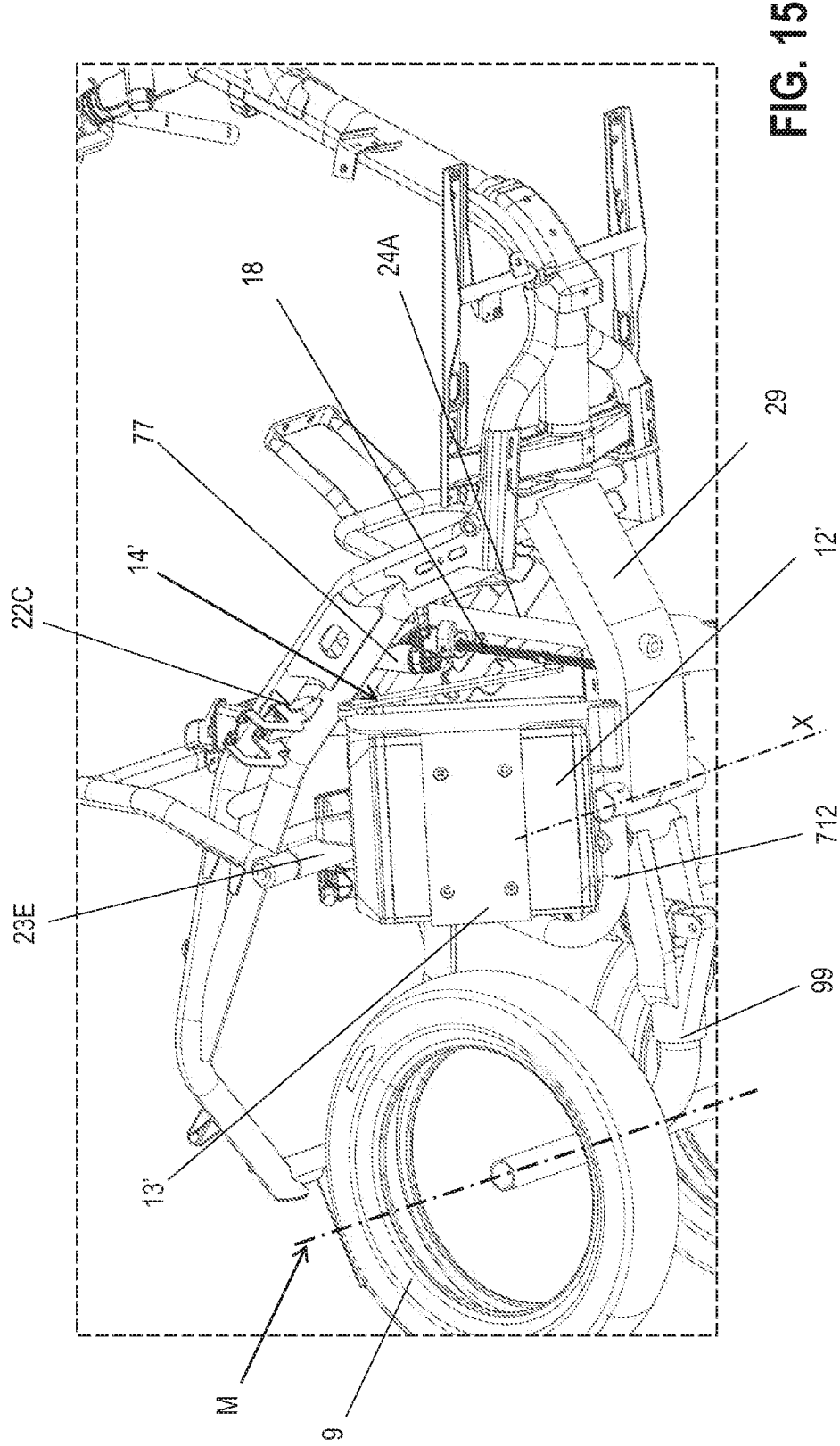

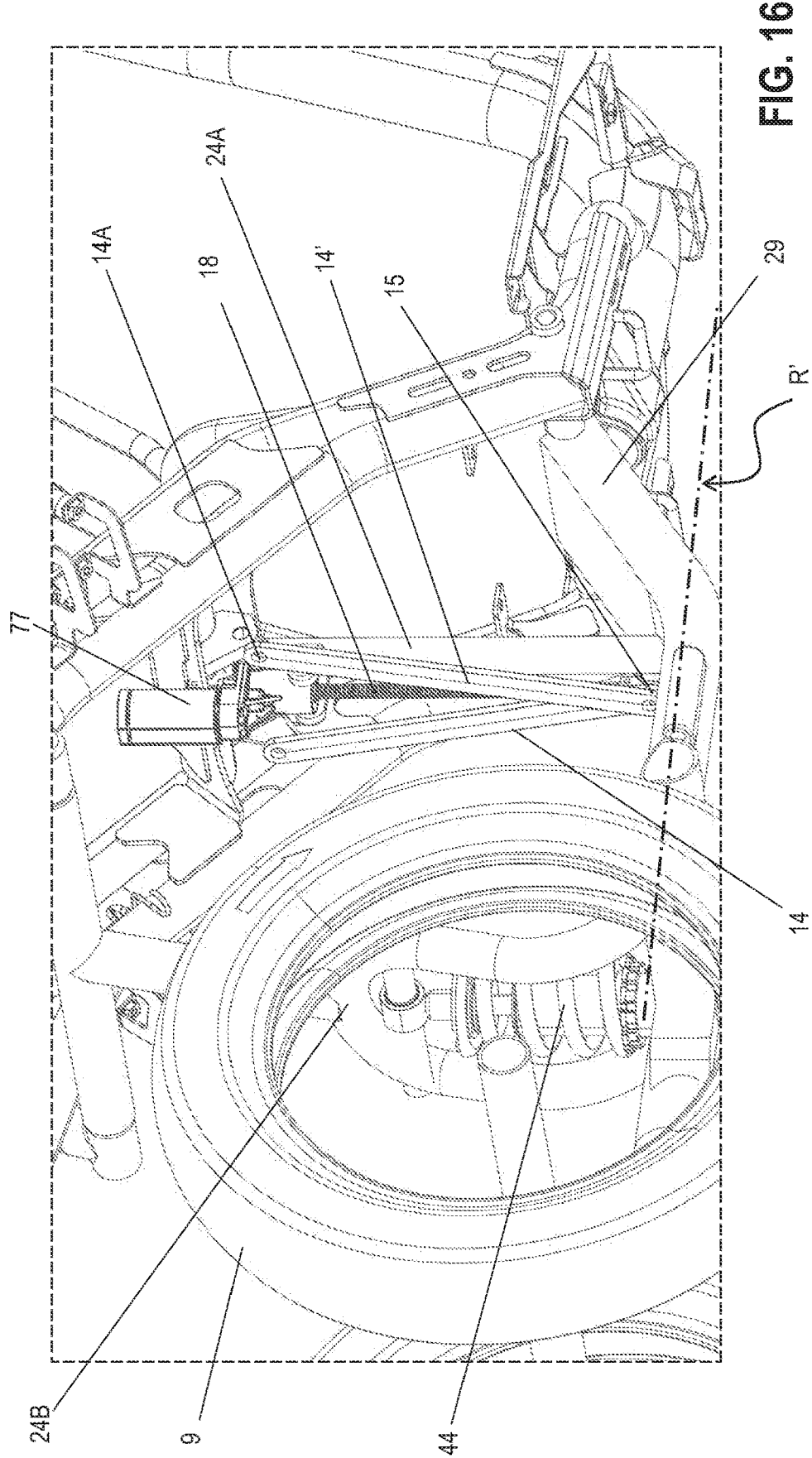

SADDLE-RIDING TYPE VEHICLE WITH A SIMPLIFIED BATTERY REMOVAL SYSTEM

The present invention falls within the field of the production of motorized saddle-riding type vehicles provided with at least two wheels. In particular, the present invention refers to a saddle-riding type vehicle of electric or hybrid type and hence provided with a battery pack. In more detail, the present invention relates to a saddle-riding type vehicle provided with a simplified system for removing and repositioning the batteries.

STATE OF THE ART

Saddle-riding type vehicles with two wheels usually comprise a front-end part that supports at least one steered wheel and a rear-end part that supports at least the driving wheel. These parts are supported by a frame that also supports the powertrain (or traction unit) for the purpose of allowing the vehicle to travel. The torque generated by the motor assembly is transferred to the driving wheel/wheels by means of a transmission system.

In general, a saddle-riding type vehicle is typically provided with two, three or four wheels; the front part (or front-end part) of the vehicle is supported by a frame front portion. Besides the steered wheel, the frame front portion also supports a handlebar. The rear part (or rear-end part) of the vehicle is supported by a frame rear portion, which in addition to the rear driving wheel also supports a saddle. Finally, an intermediate part of the vehicle, between said front and rear parts, is supported by a frame central portion which extends between said front and rear portions.

In electric or hybrid type vehicles, the traction is at least partially generated by the energy stored in a battery unit, comprising one or more battery packs, which power an electric motor. Therefore, these vehicles are provided with an electric powertrain, comprising an electric motor, transmission means for connecting the electric motor to the driving wheels and an electrical power supply assembly to which the batteries belong.

The powertrain is typically supported by the rear portion of the frame which must be configured to also accommodate all the other assemblies, devices and/or units required to ensure operation of the powertrain. These include, for example, a control unit of the electric motor and/or a charger unit of the batteries.

The need to position all these components causes a problem of overall dimensions, which is even greater in the case of hybrid vehicles in which the rear portion of the frame also supports an endothermic motor to charge the batteries.

This problem is generally solved by reducing the volume of the battery pack and compacting it as much as possible with the other components.

Nonetheless, the capacity in terms of electric charge of a battery pack is linked, in essence, to the volume it occupies, so that reducing the volume destined for it causes a reduction in the duration of travel autonomy.

Moreover, compaction of the battery pack with the further components causes difficulty in accessing the batteries themselves and hence long and complex operations for extraction and insertion of the batteries at the time of charging.

In fact, the batteries of electric or hybrid motor vehicles are charged by connecting them to an electrical power source and/or to a specific mains power supply, in both cases with alternating current. The charging columns currently installed in public places, for charging the batteries of electric or hybrid cars use direct current for charging, and therefore the only way to charge the batteries of the motorcycles and mopeds is to have a 220 V power socket available. As this condition is not always easy to achieve, in the majority of cases the driver is obliged to extract the batteries to charge them at home or in the office and then reposition them in their housing. The U.S. Pat. No. 5,477,936 discloses a battery unit divided into two symmetrical portions with respect to the longitudinal axis of the vehicle. Each portion comprises two battery packs, arranged longitudinally, so as to have high autonomy, low overall dimensions and effective cooling of the battery packs.

The patent application WO2018/178837 describes a motorcycle comprising a pair of batteries arranged on opposite sides with respect to a longitudinal center plane of the frame of the motorcycle, wherein each battery is supported by a support that is movable between a retracted position and an extended position.

The problem of a vehicle provided with a battery unit of this type lies in the complexity of the operations to remove and reposition the battery packs, when they require to be connected to a power supply or a power generator.

In fact, in order to extract the battery packs it is necessary to use a screwdriver, remove the screws, detach the covers from the relative containers, insert the hands into narrow spaces of the rear portion and extract the batteries with difficulty, risking soiling and/or injuring the hands. After the batteries have been charged, the same operations must be carried out in the reverse order, with further difficulties.

A further problem of saddle-ride type vehicles of electric or hybrid type lies in the fact that, wishing to increase the travel autonomy of the vehicle, it is necessary to increase the volume of the battery pack, thereby increasing not only the overall dimensions of the battery unit but also its weight. This makes the operations to remove and reposition battery packs even more difficult.

Currently, there are no known vehicles provided with at least two batteries that allow a rapid and simple operation to remove the batteries for charging and a subsequent rapid and simple operation to reposition them.

The Applicant has observed that the trend is to propose motor vehicles with a single battery, or with more than one battery that are difficult to access, often clamped to one another and/or connected to other components so as to minimize the lateral overall dimension of the vehicle. Evidently, this trend is difficult to reconcile with the need to obtain a travel autonomy sufficient for the normal using requirements and/or with the need to be able to extract the batteries in a simple and rapid way in order to charge them and then reposition them just as simply and rapidly. Therefore, the need for a new technical solution that overcomes these drawbacks emerges from the above.

SUMMARY

The main aim of the present invention is to provide a saddle-riding type vehicle of electric or hybrid type that allows the limits of the above-mentioned known solutions to be overcome. Within this aim, a first object of the present invention is to provide a saddle-riding type vehicle provided with a suitable power supply assembly that, besides ensuring sufficient travel autonomy, allows the operations to remove and reposition the batteries to be made simple and rapid.

Another object of the present invention is to provide a saddle-riding type vehicle with a power supply assembly that allows rapid and simple removal/repositioning of the batteries, while ensuring a reduced lateral overall dimension of the vehicle during travel.

A further object of the present invention is to provide a motor vehicle of electric or hybrid type that does not require the use of tools to remove and reposition the batteries and that is simple to manufacture at competitive costs.

The Applicant has observed that the aims and the objects indicated above can be reached by providing, for the power supply assembly, at least one first pair of batteries arranged on opposite sides with respect to a longitudinal center plane of the vehicle, a movable support for each battery and moving means which releases and/or determines the simultaneous rotation of the supports between a retracted position and an extended position. Through this solution, the batteries occupy a reduced space during travel (as in retracted position, i.e. compact) and diverge laterally in extended position so as to make their removal/repositioning simple.

In particular, the present invention relates to a saddle-riding type vehicle comprising a frame extending mainly along a longitudinal direction and comprising a front portion, a central portion and a rear portion. The front portion supports a front-end part that comprises a steering assembly pivotably connected to the front portion of the frame to control at least one steered wheel of the vehicle. The rear portion supports a rear-end part comprising a saddle and at least one driving wheel arranged below said saddle. The central portion supports an intermediate part connecting said front-end part and said rear-end part. The vehicle also comprises: a powertrain connected to the frame and comprising at least one electric motor operatively connected to said at least one driving wheel; an electrical power supply assembly suitable for powering said electric motor so as to allow the traction of the vehicle and comprising at least one first pair of batteries arranged on opposite sides with respect to a longitudinal center plane of the vehicle, orthogonal to the axis of rotation of said at least one driving wheel.

According to the present invention, each battery is supported by a corresponding support which is movable between a retracted position and an extended position. Each support is operatively connected to moving means which releases and/or determines the rotation of the support itself around a corresponding axis of rotation.

Again according to the invention, the moving means causes the simultaneous rotation of the two supports so that they both occupy said retracted position or said extended position. Preferably, the moving means comprises a pair of levers, each of which has a first end engaged with a corresponding support and a second end fixed to a common pin; the moving means further comprises an actuator acting on the common pin determining the movement of said levers.

As mentioned, this combination of features makes it possible to produce a motor vehicle with high travel autonomy due to the presence of at least one pair of batteries, with small lateral overall dimension, due to the possibility of maintaining the batteries in retracted position during travel, and due to the possibility of simple and rapid extraction of the batteries upon reaching the extended position.

Moreover, a vehicle of this type does not require tools for the removal and assembly of the batteries and is simple to manufacture at competitive costs.

According to preferred embodiments, the supports are rotatable around respective axes of rotation parallel to said center plane. In a possible embodiment, the axes of rotation are inclined with respect to a support plane of the vehicle. Alternatively, these axes of rotation are orthogonal to said axis of rotation of said at least one driving wheel.

Preferably, the pin is vertically movable on said longitudinal center plane by means of said actuator which, by controlling the upward or downward translation of said pin, determines a movement towards said extended position or towards said retracted position of the supports, respectively.

In a possible embodiment, the moving means comprises a coupling/uncoupling system that comprises at least one first coupling element that removably engages with a second coupling element integral with at least one of said supports so as to lock the latter in the retracted position; following disengagement of said coupling elements said at least one of said supports is free to rotate about said corresponding axis of rotation to reach the extended position. Preferably, the uncoupling system comprises, for each of said batteries, a first coupling element associated with the frame and a second coupling element integral with a corresponding of said supports, wherein each first coupling element removably engages with a corresponding second coupling element to lock the corresponding support in said retracted position.

Even more preferably, the coupling/uncoupling system comprises a control unit, manually and/or electrically activated, that determines the disengagement of each first coupling element from the corresponding second coupling element.

In a possible embodiment thereof, this control unit selectively intervenes on the first coupling elements to uncouple one of said supports independently from the other. Alternatively, the control unit is configured to simultaneously intervene on said first coupling elements to simultaneously uncouple said supports.

In a possible embodiment, the motor vehicle is provided with safety means configured at least to trigger the movement of said supports from said retracted position to said extended position.

Preferably, the moving means comprises damper elements suitable to control the speed of rotation of the supports.

In accordance with a preferred embodiment, the batteries and the respective supports are positioned at the rear-end part and supported by a battery-holder frame connected to the rear portion of the frame.

Preferably each battery is provided with a gripping means suitable to further simplify extraction from the respective support.

LIST OF FIGURES

Further features and advantages of the invention will be more apparent by examining the following detailed description of some preferred, but not exclusive, embodiments of the vehicle, illustrated by way of non-limiting example with the support of the accompanying drawings, wherein:

FIGS. 7 and 8 are sectional views, along the section plane V-V of FIG. 4, of the vehicle in the configuration of FIG. 2 and in the configuration of FIG. 3, respectively;

FIGS. 11 and 12 are a side view and a perspective view of a second possible embodiment of a vehicle according to the present invention, respectively;

FIGS. 15 and 16 are views from different observation points of a rear-end part of the vehicle of FIGS. 11 and 12;

The same reference numbers and letters in the figures identify the same elements or components.

DETAILED DESCRIPTION

With reference to the aforesaid figures, the present invention thus relates to a saddle-riding type vehicle indicated generically with the reference 1.

The term "saddle-riding type vehicle", in the present context, indicates any moped or motorcycle having at least two wheels, i.e., at least one front wheel and at least one rear wheel. Therefore, this definition includes: two wheeled motorcycles; three-wheeled motorcycles having two front steered wheels and one rear driving wheel or one front steered wheel and a pair of rear driving wheels; quadricycles having, for example, two front steered wheels and two rear driving wheels.

Therefore, hereinafter the vehicle 1 will also be indicated with the term motor vehicle 1 or motorcycle 1.

Figure 4:
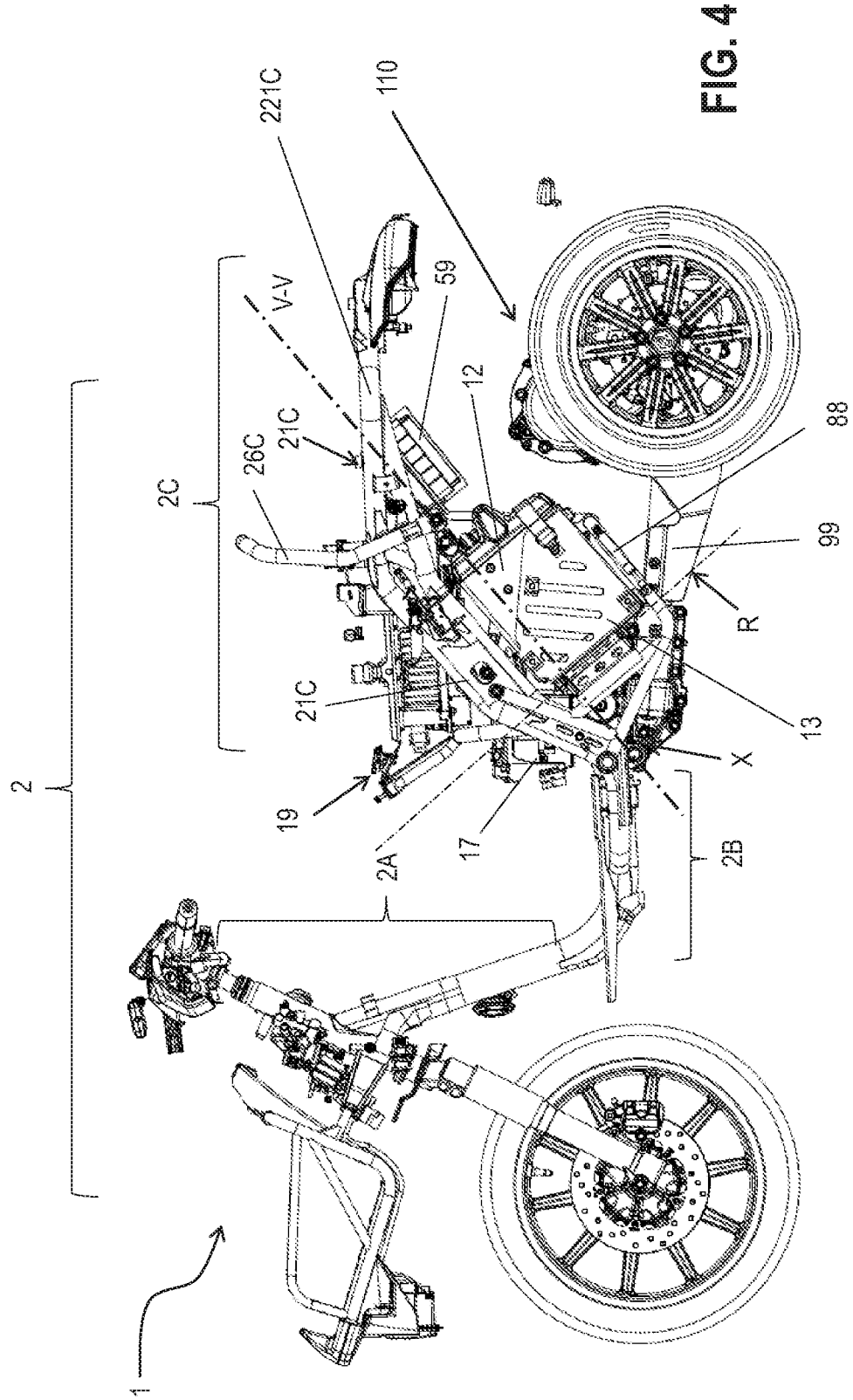
FIG. 4 is a side view of the vehicle of FIG. 2.

The vehicle 1 comprises a frame 2, in turn comprising a frame front portion 2A, a frame central portion 2B and a frame rear portion 2C (see FIGS. 4 and 11).

The front portion 2A of the frame 2 supports a front-end part 3 of the motor vehicle 1 that comprises a steering assembly 4, pivotably connected to the front portion 2A. The steering assembly 4 controls at least one steered wheel 5 (or front wheel 5) (see FIGS. 1 and 12).

In a particular embodiment of the motor vehicle 1, not illustrated in the figures, the front-end part 3 comprises two front wheels 5 connected to each other and to the front portion 2A of the frame 2 by means of a steered rolling four bar linkage.

The rear portion 2C of the frame 2 supports a rear-end part 6 that comprises a saddle 7 (shown only in FIGS. 11 and 12) and at least one driving wheel 9 (or rear wheel 9), supported by a fork 99 hinged to the rear portion 2C of the frame 2 (see FIGS. 4 and 12). In this regard, in the embodiments shown in the figures, the rear-end part 6 comprises two driving wheels 9 supported by a fork 99 hinged to the rear portion 2C so as to rotate around an axis X parallel to the axis of the driving wheels 9. The rear-end part 6 is also provided with at least one shock absorber 44 (indicated in FIGS. 7 and 8) operatively arranged between the fork 99 and an element of the rear portion 2C of the frame 2, also in this case according to a known principle. The vehicle 1 comprises an intermediate part 10 connecting the front-end part 3 and the rear-end part 6 (see FIGS. 1 and 12). This intermediate part 10 is supported by the central portion 2B of the frame 2 and is of footboard type, i.e., provides a support for the feet of the driver. The frame 2 extends mainly along a longitudinal direction L which is substantially orthogonal to the axis of rotation M of the driving wheel 9 and hence parallel to the direction of forward movement of the vehicle 1, when travelling.

In particular, for the purposes of the present invention, the expression "longitudinal direction L" is meant as a direction parallel to the direction of forward movement of the vehicle 1 and orthogonal to the axis of rotation M of the driving wheel, while the expression "transverse direction T" is intended as a direction substantially orthogonal to the longitudinal direction L and parallel to the axis of rotation M of the driving wheel 9. Finally, the expression "normal direction N" is meant as a direction orthogonal to the longitudinal direction L and to the transverse direction T. These three directions are illustrated by the half-lines L, T and N in FIGS. 2 and 12 (respectively relative to two different embodiments of a motor vehicle 1 according to the invention). Directions of travel, indicated by the arrows present on these half-lines, are also visible in these figures. These arrows indicate respectively the front, left and top direction with respect to any point of the vehicle 1.

Therefore, the terms "longitudinally or longitudinal", the terms "transversely or transverse" and the terms "normally or normal" refer to the longitudinal direction L, to the transverse direction T and to the normal direction N, respectively. The terms "at the front", "on the left" and "above" refer to the direction indicated by the arrows in FIGS. 2 and 12. Analogously, the terms "at the rear", "on the right" and "below" indicate opposite directions to those indicated by the arrows in FIGS. 2 and 12.

Figure 6:
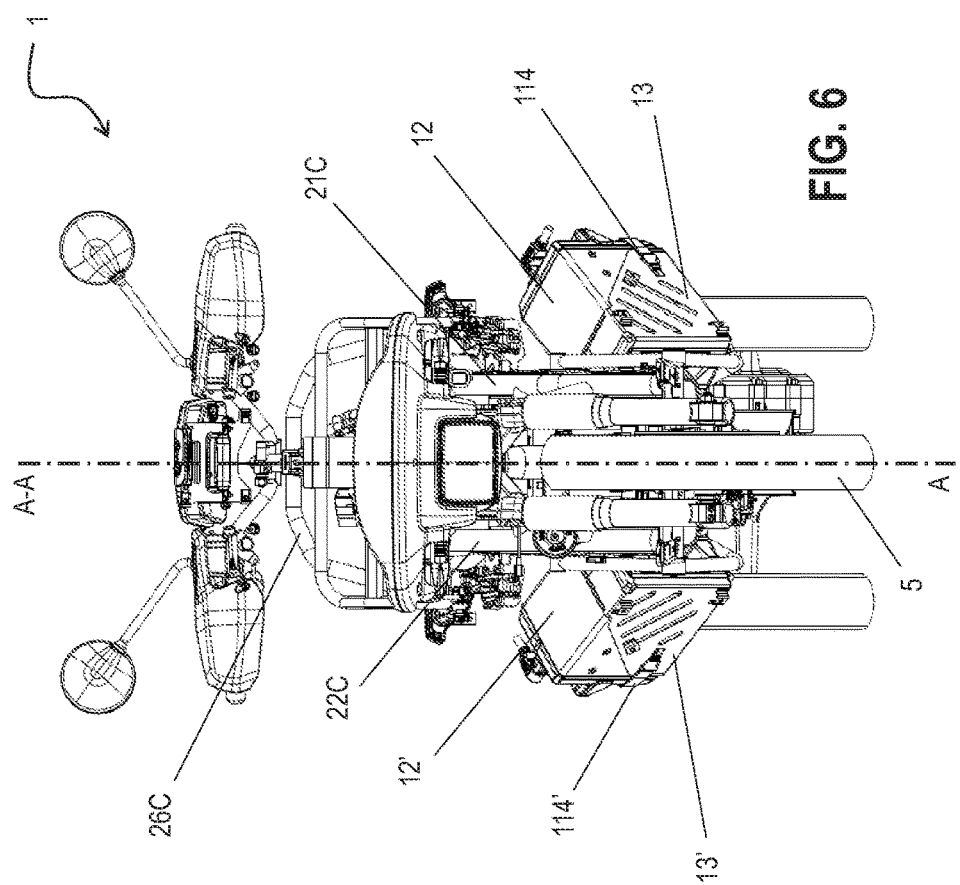
FIGS. 5 and 6 are front views of the vehicle in the configuration of FIG. 2 and of FIG. 3, respectively.
Figure 5:
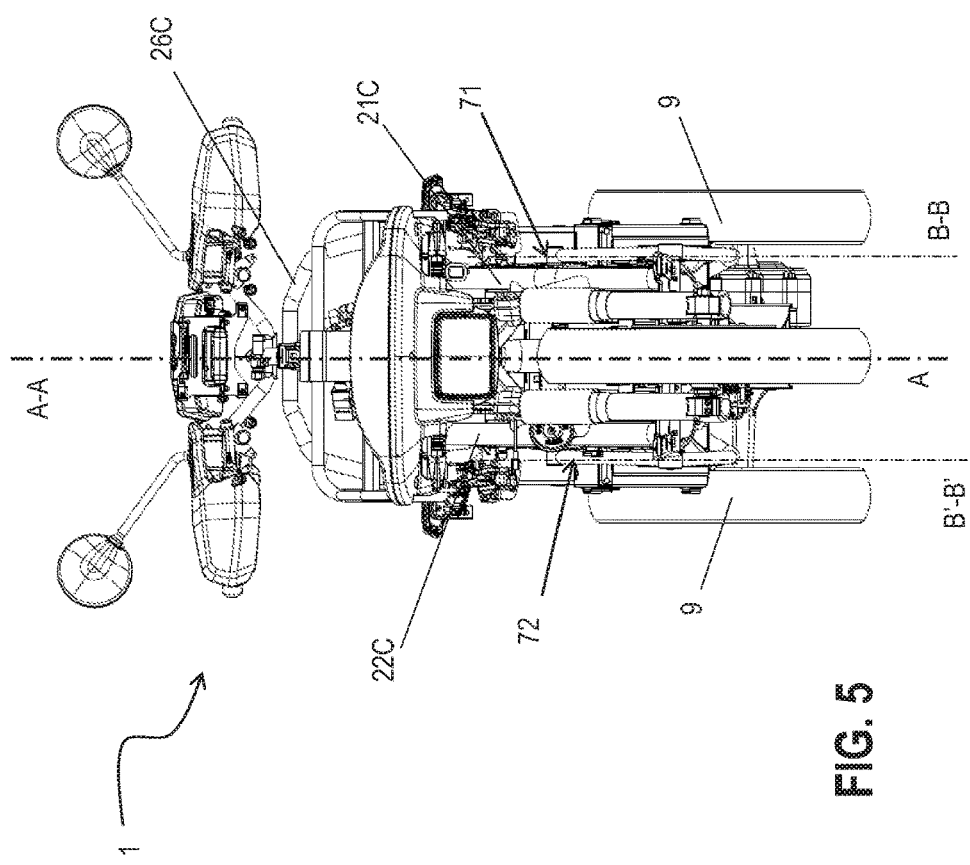

In FIGS. 5 and 6 (relating to the first embodiment) and 17-18 (relating to the second embodiment), a longitudinal center plane A-A of the vehicle 1 is indicated. This plane A-A extends mainly in the longitudinal direction L of the vehicle, but also in the normal direction N, being orthogonal to the transverse direction T, and hence to the axis of rotation M of the driving wheel 9, and divides the vehicle 1 into two substantially symmetrical half portions: a right half portion and a left half portion. The longitudinal center plane A-A is a substantially vertical plane, when the vehicle 1 is in the position of use.

The motorcycle 1 comprises a powertrain 110 which in turn includes at least one electric motor 111 and transmission means 112 that operatively connect the electric motor 111 to said at least one driving wheel 9. In an embodiment thereof, shown in the figures, the powertrain 110 also comprises a clutch, a gearbox and a transmission assembly, in a known manner. The clutch could be of "dry" disc type or alternatively of "oil bath" type, or could be of any other type suitable for the purpose. The transmission means 112 comprises a plurality of gear mechanisms suitable to generate a torque on the hub shaft of the driving wheel 9.

In general, the configuration of the powertrain 110 is not relevant for the purposes of the present invention. In particular, the configuration and the operation of the electric motor 111 and of the transmission means 112 are widely known to the person skilled in the art and therefore they will not be further described. Moreover, the powertrain 110 could also be of hybrid type and also comprise a thermal motor.

In any case, the vehicle 1 according to the invention comprises an electrical power supply assembly 12-12' suitable for powering the electric motor 111 so as to allow the traction of the vehicle 1. The electrical power supply assembly 12-12' comprises at least one first pair of batteries 12, 12' arranged on opposite sides with respect to the longitudinal center plane A-A of the vehicle 1. In other words, at least one first battery 12 is positioned in the right half-portion and at least one second battery 12' is positioned in the left half-portion of the vehicle 1, as can be seen in the figures (for example in FIGS. 4 and 5 or 13 and 14). Two or more pairs of batteries 12, 12' can be provided, which are analogously positioned with respect to the longitudinal center plane A-A and arranged longitudinally side by side with the first pair.

Figure 2:
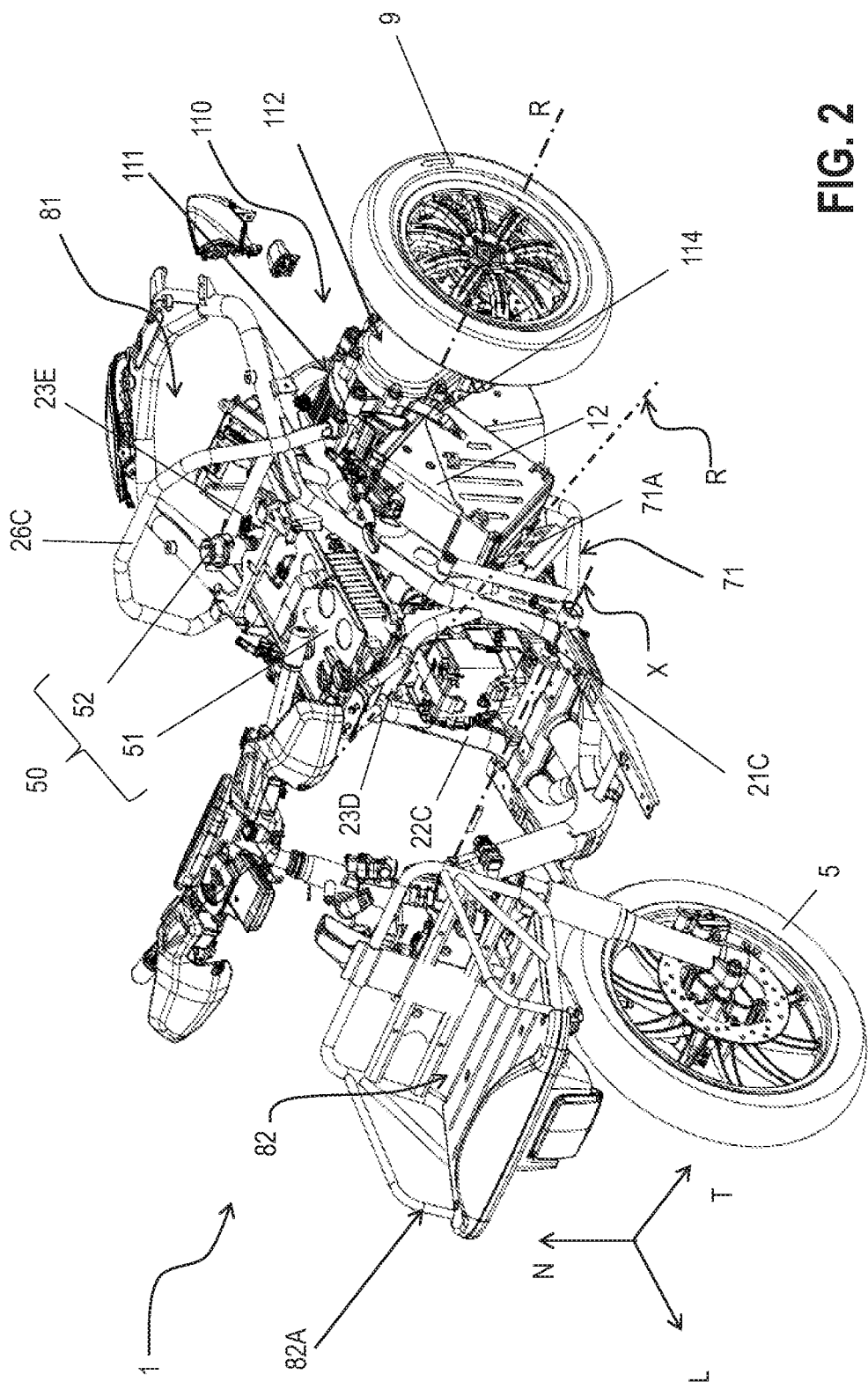
FIGS. 2 and 3 are perspective views of the vehicle of FIG. 1, without the fairing, in a first configuration and in a second configuration of the vehicle itself, respectively.
Figure 3:
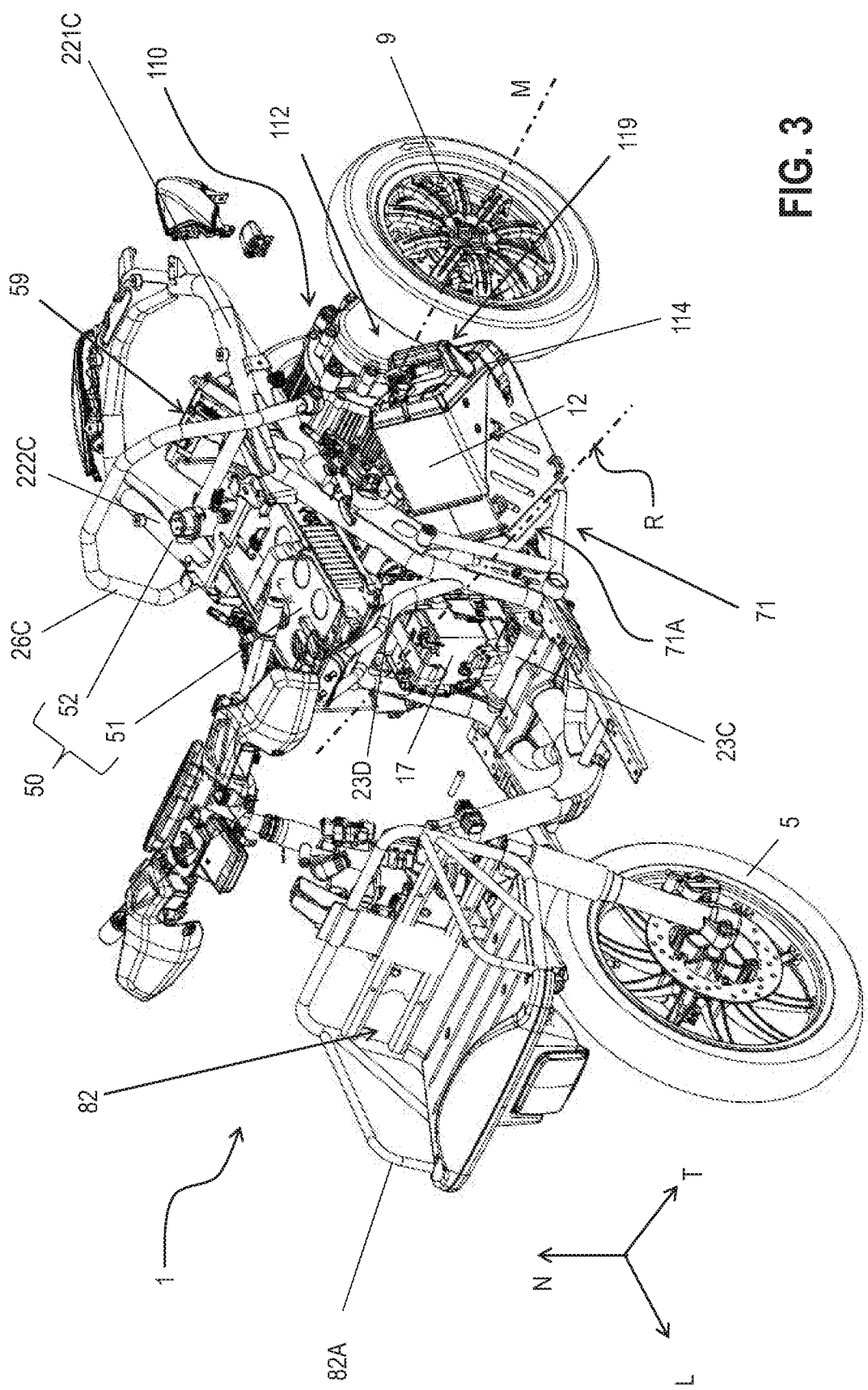

The batteries 12, 12' can be charged by means of a charger unit 50 comprising a charging module 51 and a connection (electrical socket) 52 to connect the charging module 51 to an electrical power source and/or to a specific mains power supply. As can be seen in FIGS. 2 and 3, the charging module 51 is preferably supported by the rear portion 2C of the frame 2 in a position under the saddle 7.

With reference to FIGS. 3 and 4, according to a known solution, control of the electric motor 11 is allowed by a control unit 59 comprising an inverter module. Preferably, also this control unit is supported by the rear position 2C of the frame 2.

The motor vehicle 1 is also provided with a service battery 17 used for starting the vehicle 1 and/or for supplying other electrically operated devices installed in the vehicle, as indicated below. FIGS. 3 and 4 show a preferred installation position of the service battery 17 so that the same is supported by the rear portion 2C of the frame 2 in a position close to the intermediate portion 2B or to the intermediate part 10 of the motor vehicle 1.

The above indications for the powertrain 110, the charger unit 50, the control unit 59 and the service battery 17 should also be considered valid for the embodiment shown in FIGS. 11 to 18 in which these operating assemblies/devices have not been illustrated with the aim of simplifying the figures.

According to the present invention, each battery 12, 12' is supported by a corresponding support 13, 13' movable between a retracted position and an extended (or extracted) position. In particular, the first battery 12 is supported by a first support 13 and the second battery 12' is supported by a second support 13'. According to the invention, each support 13, 13' is operatively connected to moving means 8, 8' which determines and/or releases the rotation of the support 13, 13' itself around a corresponding axis of rotation R, R', in particular from said retracted position to said extended position.

Within the scope of the present invention, the retracted position corresponds to a first compact and aerodynamic position with a reduced transverse overall dimension, while the extended (or extracted) position corresponds to a second position convenient for extraction of the batteries 12, 12' to be charged and for their subsequent repositioning in the supports 13, 13'. Therefore, the moving means has the function of allowing the batteries 12, 12' to pass from said first (retracted) position to said second (extended) position.

For the purposes of the present invention, the terms "battery" and "battery pack" are to be considered synonymous and indicate a set consisting of a plurality of battery cells inserted inside a battery casing, of any form. Preferably, at least one battery 12, 12' of the power supply assembly is of lithium type. Even more preferably both the batteries 12, 12' are of lithium type. However, one lithium battery and one battery of a different type, such as lead/acid type, could also be provided.

As mentioned above, FIGS. 1 to 10 relate to a first embodiment of the vehicle according to the invention. In FIGS. 2, 3 and 4 a possible, and hence nonexclusive, configuration of the frame 2 that also supports a saddle (not illustrated) according to a widely known solution can be observed. The configuration of the frame 2 is not relevant for the purposes of the present invention and therefore can be of any known type. In this regard, in the case of hybrid propulsion, the frame 2 could also support a tank.

In any case, as already indicated above, for the frame 2 it is possible to identify a front portion 2A with which the steering assembly 4 is pivotably associated and a rear portion 2C supporting the saddle and with which the fork 99, and hence the driving wheel 9, is pivotably associated. A central portion 2B of the frame 2 extends in the manner of a bridge between the two portions 2A, 2C acting as a connection and supporting a footboard (see FIG. 4).

In the embodiment shown in FIGS. 1 to 10, the rear portion 2C comprises a first frame side 21C and a second frame side 22C which extend respectively on the right and left side with respect to the center plane A-A. The two sides 21C, 22C are connected to each other by transverse elements 23C, 23D, 23E which maintain them spaced apart thereby establishing their position with respect to the center plane A-A. A space is thus defined between the two sides 21C, 22C in which the charger unit 50, the service battery 17 and the control unit 59 are placed.

In the embodiment illustrated in the figures, the end portions 221C, 222C of the two sides 21C, 22C (i.e., the most distal portion from the front-end part 3) extend on a plane substantially parallel to the support plane PO of the motor vehicle 1, where the orientation of this plane is considered in a condition with the vehicle unloaded (see FIG. 4).

Figure 1:
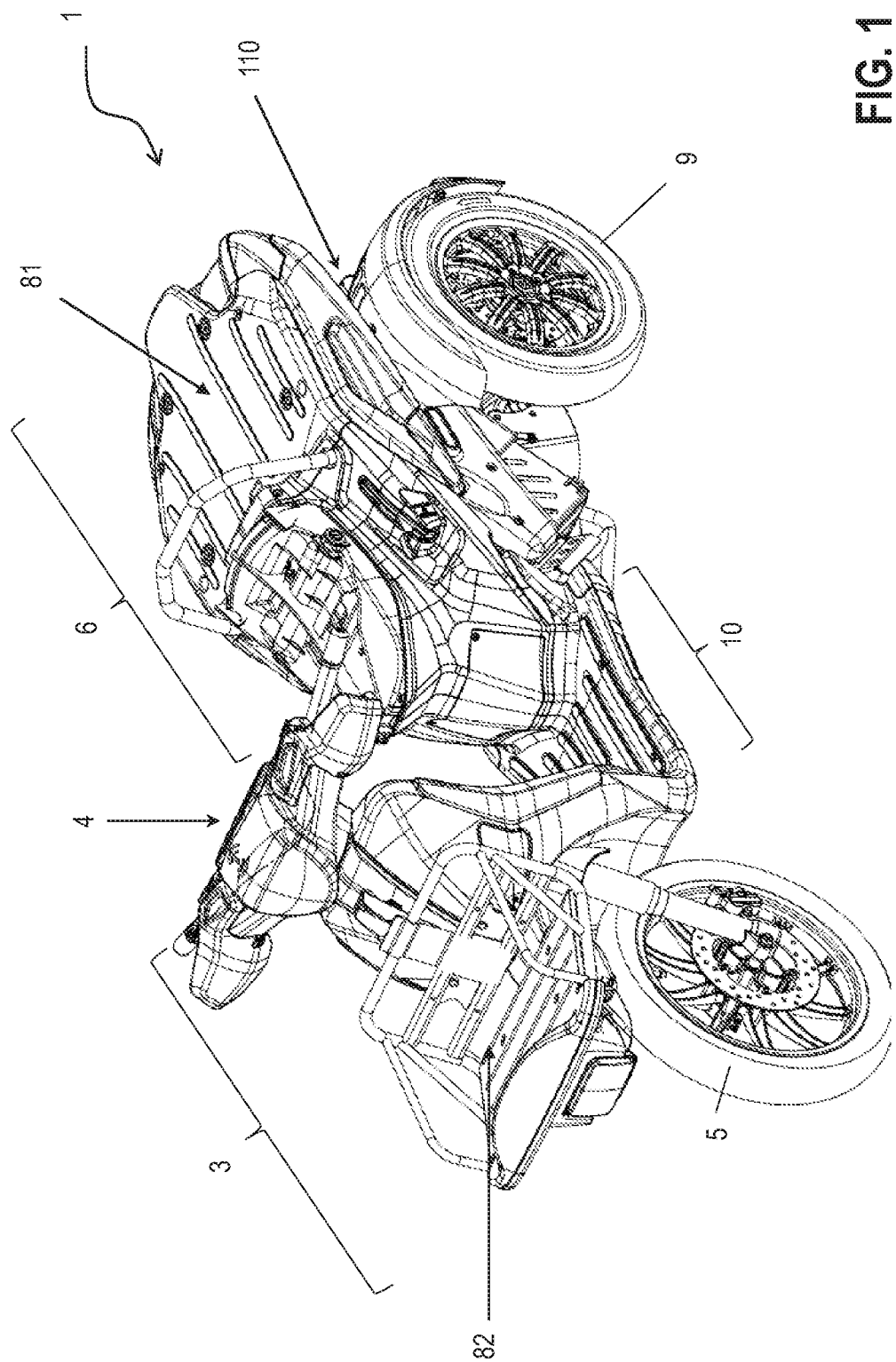
FIG. 1 is a perspective view of a first possible embodiment of a vehicle according to the present invention.

The rear portion 2C of the frame 2 comprises an upper element 26C that extends above the two sides 21C, 22C (i.e., in the normal direction N) with an upside down U-shaped configuration (see FIGS. 5 and 6). Said upper element 26C externally connects the two sides 21C, 22C close to where the end portions 221C, 222C start. As can be seen in FIGS. 1 and 4, the end portions 221C, 222C and the upper element 26C define as a whole a rear space 81 for positioning a load or a load-holder compartment.

The motor vehicle 1 illustrated in FIGS. 1 to 10 is also provided with a front frame 82A, associated with the front-end part 3 and supported by the front portion 2A of the frame 2, defining a further front space 82 for positioning a further load or a further load-holder compartment.

In a preferred embodiment shown in the figures, the two batteries 12, 12' are installed on a battery-holder frame comprising a first lateral portion 71 connected to the first side 21C and a second lateral portion 72 connected to the second side 22C. The two lateral portions 71, 72 are arranged specularly with respect to the center plane A-A (see FIG. 5) and are connected to each other by a transverse portion 73 (visible in FIG. 8) which extends transversely. As can be seen in FIG. 5, the lateral portions 71,72 of the battery-holder frame 70 are preferably arranged outside the sides 21C, 22C of the rear portion 2C of the frame 2. In substance, the two lateral portions 71, 72 remain outside the space defined between the two sides 21C, 22C.

The first support 13 of the first battery 12 is hinged to the first lateral portion 71, while the second support 13' of the second battery 12' is hinged to the second lateral portion 72. In particular, each support 13, 13' is preferably hinged to a supporting element 71A, 72A (of the corresponding lateral portion 71,72) connected rigidly to the corresponding lateral portion 71, 72 (see FIG. 10). Preferably, this supporting element 71A, 72A is configured so as to define an end of stroke surface 71B, 72B for the opening movement of the corresponding support 13, 13'.

Figure 10:
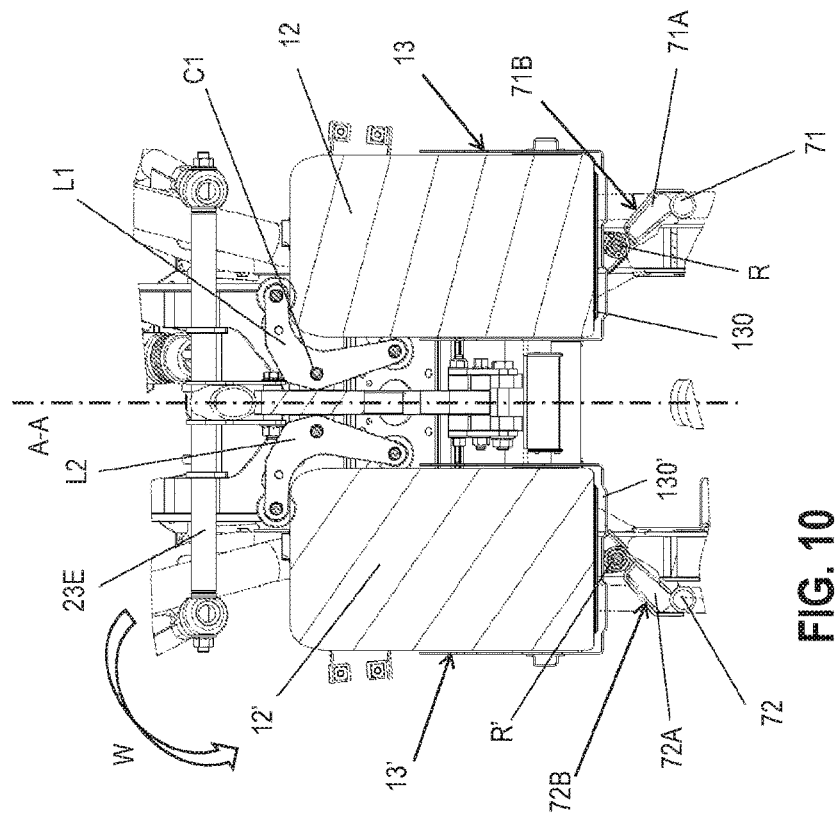
FIGS. 9 and 10 are section views of a group of components of the vehicle in the configuration of FIG. 2 and in the configuration of FIG. 3, respectively.
Figure 9:
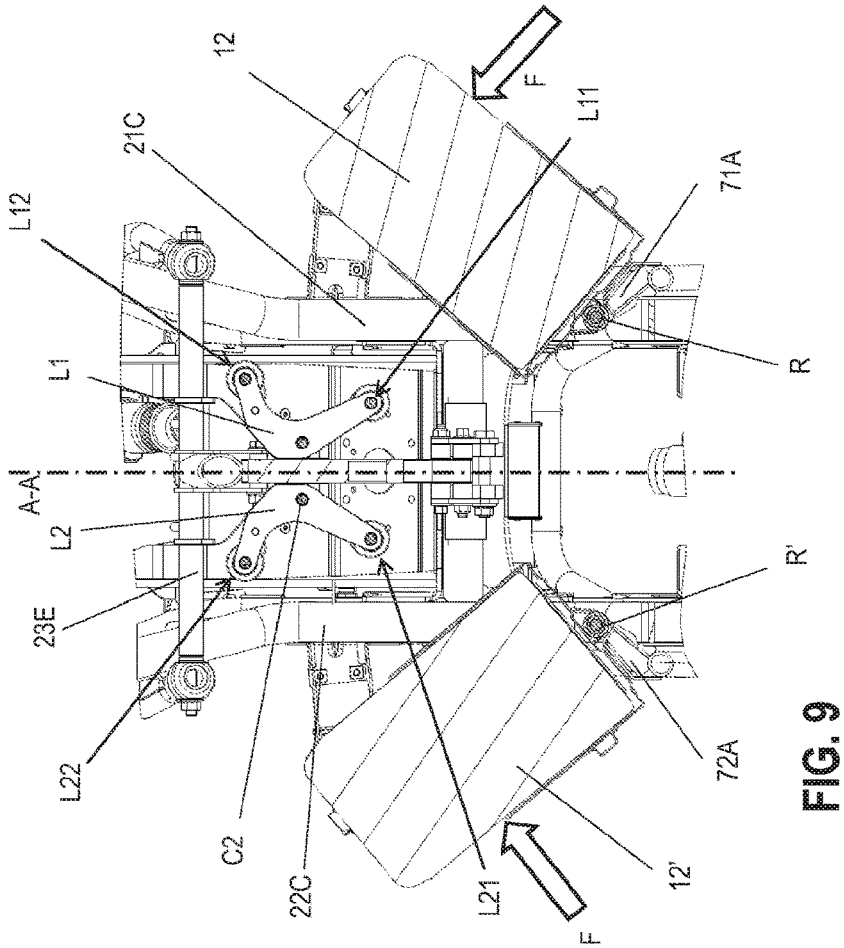

The sectional views of FIGS. 9 and 10 allow observation of the solution described above. These figures show the supports 13,13', with the relative batteries 12, 12', respectively in the retracted position (FIG. 10) and in the extended position (FIG. 9). It can be observed how the amplitude of the opening movement (arrow W in FIG. 10) of each support 13, 13' is established by the corresponding end of stroke surface 71B, 72B.

According to the invention, the supports 13, 13' consist of internally hollow bodies, i.e., defining a cavity for housing the corresponding battery 12, 12'. Therefore, the shape of said cavity is at least partly geometrically conjugated with those of the corresponding battery 12, 12'. In the embodiment shown in the figures, the supports 13, 13' have a prismatic configuration that extends from a base 130, 130' whose outer side is hinged to the supporting element 71A, 71B integral with the corresponding lateral portion 71, 72 of the battery-holder frame 71-72 (see FIG. 10).

In this regard, the base 130, 130' of each support 13, 13' can be hinged to the corresponding supporting element 71A, 71B in a central position so that the volume of the relative support 13, 13', considered in the retracted position, is equally divided with respect to a reference plane B-B, B-B' parallel to the center plane A-A and containing the corresponding axis of rotation R, R' (see FIG. 5). Alternatively, each support 13, 13' could be hinged in an off-centered position so that the volume of the relative support 13, 13', considered in the retracted position, is divided into an inner part and an outer part with respect to said reference plane B-B, B-B, where said outer part is greater than said inner part. In this way, the weight of the support 13, 13' is offset towards the outside facilitating its movement towards the extended position.

In accordance with a preferred embodiment, the axes of rotation R, R' are preferably defined so that at least half of the volume of the relative support 13, 13', considered in the retracted position, is included in the space comprised between the center plane A-A and the corresponding reference plane B-B, B'-B' defined above. As can be seen from FIGS. 5 and 7 viewed in combination, this solution allows the total transverse overall dimension linked to the two batteries 12, 12' to be reduced. In this regard, it can be observed how in the retracted position the two batteries 12, 12' are positioned on opposite sides of the center plane A-A, in a position adjacent to the shock absorber 44, i.e., internal with respect to the two sides 21C, 22C.

In accordance with a first possible embodiment, visible in the figures, the moving means comprises a coupling/uncoupling system 8 that comprises at least one first coupling element 15, integral with the rear portion 2C of the frame 2, that removably engages with a second coupling element 16 integral with at least one support 13, 13' so as to lock the latter, and therefore the battery 12, 12' housed therein, in the retracted position. Following disengagement of the two elements 15, 16, the relative support 13,13' is free to rotate about the corresponding axis of rotation R, R allowing the battery 12,12' to reach the extended position.

In accordance with an embodiment shown in FIGS. 7 and 8, the coupling/uncoupling system comprises, for each of said batteries 12, 12', a first coupling element 15 integral with the frame 2 and a second coupling element 16 integral with a corresponding support 13, 13'. Each first coupling element 15 removably engages with said second coupling element 16 to lock the corresponding support 13, 13', and hence the battery 12, 12' housed therein, in the retracted position. Therefore, in its entirety, the possible embodiment shown in the figures is provided with two first coupling elements 15 arranged on opposite sides and specularly with respect to the center plane A-A and two second coupling elements 16 each integral with a corresponding support 13, 13'.

In any case, the coupling/uncoupling system comprises a control unit (manually and electrically activated) that determines the disengagement of each first coupling element 15 from the corresponding second coupling element 16. In particular, the control unit determines the movement of each first element 15 between two operating positions, characteristic respectively of a condition of engagement with/disengagement from a corresponding second coupling element 16.

With reference to FIGS. 7 and 8, in the retracted position, each first coupling element 15 maintains the condition of engagement with a respective of said second coupling elements 16 thereby preventing the rotation of the corresponding support 13, 13', and of the relative battery 12, 12', around the corresponding axis of rotation R, R' (condition in FIG. 7). When the first coupling elements 15 are no longer engaged with the second coupling elements 16 (following the intervention of the control unit) the two supports 13, 13' are free to rotate about the respective axes of rotation R, R' so as to take the two batteries 12, 12' to the extracted position.

In a possible embodiment, the control unit acts selectively on the two first coupling elements 15, i.e., so as to release each support 13, 13' independently from the other. Therefore, one battery 12, 12' can rotate from the retracted position to the extended position, while the other remains in the retracted position.

In an alternative configuration, the control unit is configured so as to intervene simultaneously on said first coupling elements 15 i.e., so as to disengage/decouple both from the respective second coupling elements 16 at the same time.

In an alternative configuration, the control unit could be configured so as to include both the operating modes indicated, i.e., so as to allow simultaneous or non-simultaneous release of the batteries 12, 12'.

In the embodiment shown in the figures, in their entirety, the coupling/uncoupling system is configured as a lock conceptually of the "latch type". In fact the two first coupling elements 15 consist of pin bodies, while the second coupling elements 16 consist of a pair of U-shaped brackets integral with the inner side of a corresponding support 13, 13'. Each bracket defines a cavity inside which the corresponding pin body is snap inserted, locking the corresponding support 13, 13' when this reaches said retracted position. Following its activation, the control unit moves the pin body thus releasing the rotation of the support 13, 13'.

In the embodiment shown in the figures, the control unit is manually operated and comprises a pair of levers 19 arranged in the region under the saddle 7 (see FIG. 4). These levers 19 are mechanically connected to the first coupling elements 15 (for example through Bowden cables) so as to cause their movement.

Preferably, the control unit is also provided with an electrically operated release. In this case, the movement of the two first coupling elements 15 is generated by a means (such as a push button) that can be activated by the rider and positioned, for example, on the handlebar or rear-shield of the motor vehicle 1.

According to a preferred embodiment shown in the figures, the moving means of the batteries 12, 12' comprises damper elements 88 whose function is to control the speed of rotation of the supports 13 and dampen their impact at least at the end of stroke, i.e., at least in the last stage of the movement from the retracted position to the extended position. These damper elements 88 can be gas springs, hydraulic dampers or dampers of other type and have the function of controlling the speed of rotation of the supports 13 and damping the impact of the same at the end of stroke.

In the embodiment shown in the figures, the damper elements 88 comprise a pair of gas springs each of which intervenes on a corresponding support 13, 13'. In particular, for each spring, a first end is connected to one of the two supports 13, 13', while a second end, opposite the first, is connected to the rear portion 2C of the frame. More precisely, in the solution illustrated, the second end of the gas spring is connected to an element of the corresponding lateral portion 71, 72 of the battery-holder frame. However, said second end could be connected to any other point of the frame 2, for example to a side 21C, 22C.

In accordance with a preferred embodiment of the invention, the motor vehicle 1 comprises safety means configured at least to guide the movement of the batteries 12, 12' from the retracted position to the extended position. The term "guide" indicates that this means triggers or facilitates the movement of the supports 13, 13' towards the extended position after they have been released through the control unit.

Preferably, the safety means are also configured so as to exert a locking action on each battery 13, 13' to stabilize the same inside the relative support 13, 13' during forward travel of the motor vehicle 1.

In the embodiment shown in the figures, the safety means comprises a pair of levers L1, L2 which are substantially L-shaped and hinged to an element of the frame 2 in a position adjacent to the center plane. The two levers L1, L2 are installed in a specular position with respect to the center plane A-A and so that for each lever the longer side remains more adjacent to the center plane A-A and the shorter side extends away from this plane. This arrangement allows the end L11, L21 of the longer side to come into contact with the inner side of a corresponding support 13, 13' or battery 12, 12', and the end L12, L22 of the shorter side to come into contact with the upper side of one of the batteries 12, 12'. Each lever L1, L2 is subjected to the action of elastic means (not visible in the figures) that tends to rotate the lever L1, L2 in a direction such as to push the relative support 13, 13', with the end L11, L21 of the longer side, towards the extended position.

FIG. 9 shows the two batteries 12, 12' in the extracted position and allows the arrangement of the two levers L1, L2 and their centers of rotation C1, C2 to be observed. Following a force (arrow F) applied manually, each battery 12, 12' rotates about the corresponding axis of rotation R, R' towards the retracted position. Following this rotation, for each battery 12, 12', an inner surface of the corresponding support 13, 13' (or of the battery 12, 12' itself) comes into contact with the end L11, L21 of the longer side of the corresponding lever L1, L2 determining its rotation in a direction contrary to that of the support itself. This rotation continues until completion of the rotation of the batteries 12, 12', i.e., until the two supports 13, 13' are locked in the retracted position. In this condition, for each lever L1, L2, the end L12, L22 of the shorter side acts against the upper surface of the corresponding battery 12, 12' pushing it towards the axis of rotation R, R'. This thrust stabilizes the position of the battery 12,12' inside the corresponding support 13, 13'.

When the two supports 13, 13' are uncoupled (simultaneously or nonsimultaneously, as indicated above), due to the elastic means that acts on the two levers L1, L2, these exert a lateral thrust onto the batteries 12, 12' each through the end L11, L21 of the longer side. This thrust ensures triggering of the rotation of the batteries 12, 12' towards the extended position. In other words, the action of the two levers 13,13' is to complete the action of the coupling/uncoupling system and triggers, or in any case facilitates, execution of the opening movement of the batteries 12, 12'. In this regard, the movement could also be triggered through gravity alone. However, the action of the levers L1, L2 ensures its execution.

FIGS. 11 to 18 refer to a second embodiment of a motor vehicle 1 according to the invention which differs from the first embodiment described above (FIGS. 1 to 10) mainly due to a different configuration of the moving means 8' of the supports 13, 13' and due to a different orientation of the axes of rotation R, R' of the supports themselves.

In fact, in this second embodiment the supports 13, 13' rotate about axes of rotation R, R' that are parallel to the center plane A-A and orthogonal with respect to the axis of rotation of the rear wheels 9. In other words, in this case the axes of rotation R, R' are parallel to the longitudinal direction L defined above.

In this second embodiment, the moving means determines the simultaneous rotation of the two supports 13, 13' so that they are both in the retracted position or both in the extended position. A single activation of the moving means causes at least one rotation of both the batteries 12, 12' suitable to simplify extraction from the support elements 13, 13' (movement from the retracted position to the extracted position).

As can be seen in FIGS. 13 to 16, said moving means 8' comprises an actuator 77 that acts on a pair of levers 14, 14'. Each lever 14, 14' has a first end 14A engaged with a corresponding support 13, 13' and a second end fixed to a common pin 15. Preferably, the levers 14, 14' are positioned at one end of the support 13, 13' proximal to the center plane A-A.

In accordance with the embodiment illustrated in FIGS. 11-18, the pin 15 to which the levers 14, 14' are hinged is vertically movable on the longitudinal center plane A-A of the vehicle 1 by means of said actuator 77. The latter, by controlling the motion of the pin 15 in the normal direction N, and hence its upward or downward translation, determines the movement towards the extended position or towards the retracted position of the supports 13, 13' of the batteries 12, 12'.

Figure 14:
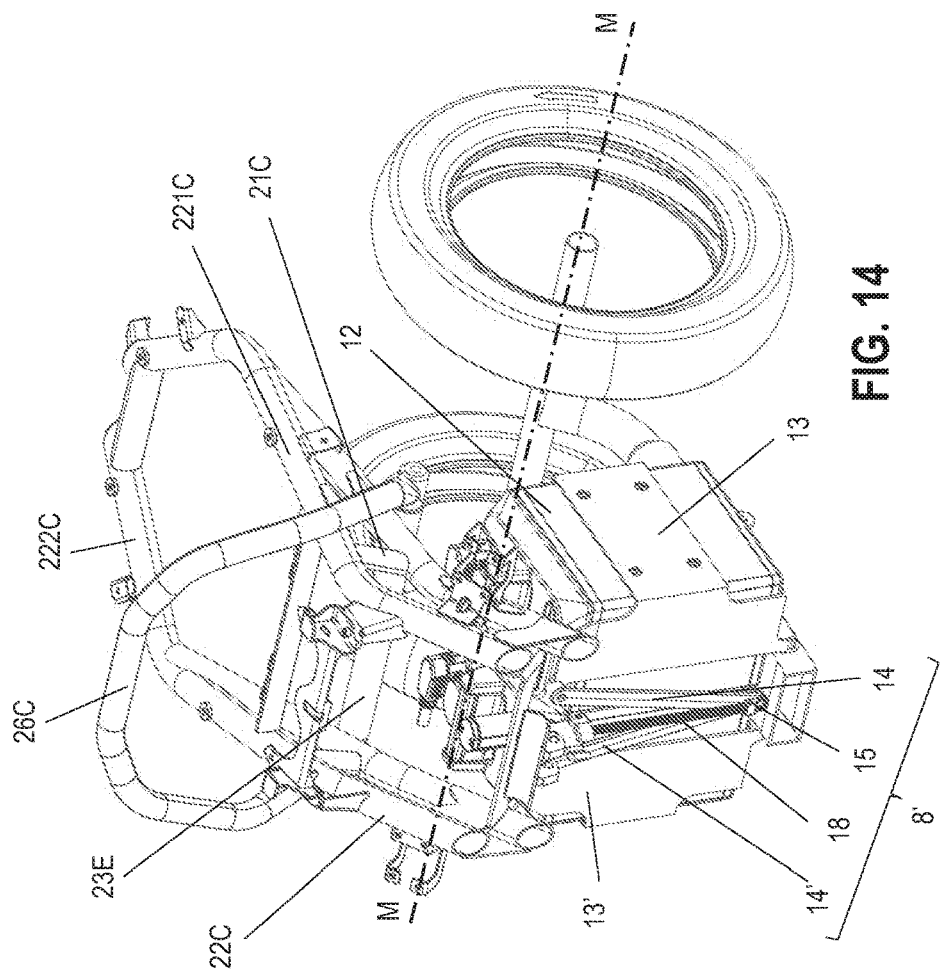
FIGS. 13 and 14 are sectional views, front and perspective respectively, along the plane X-X of FIG. 11.
Figure 13:
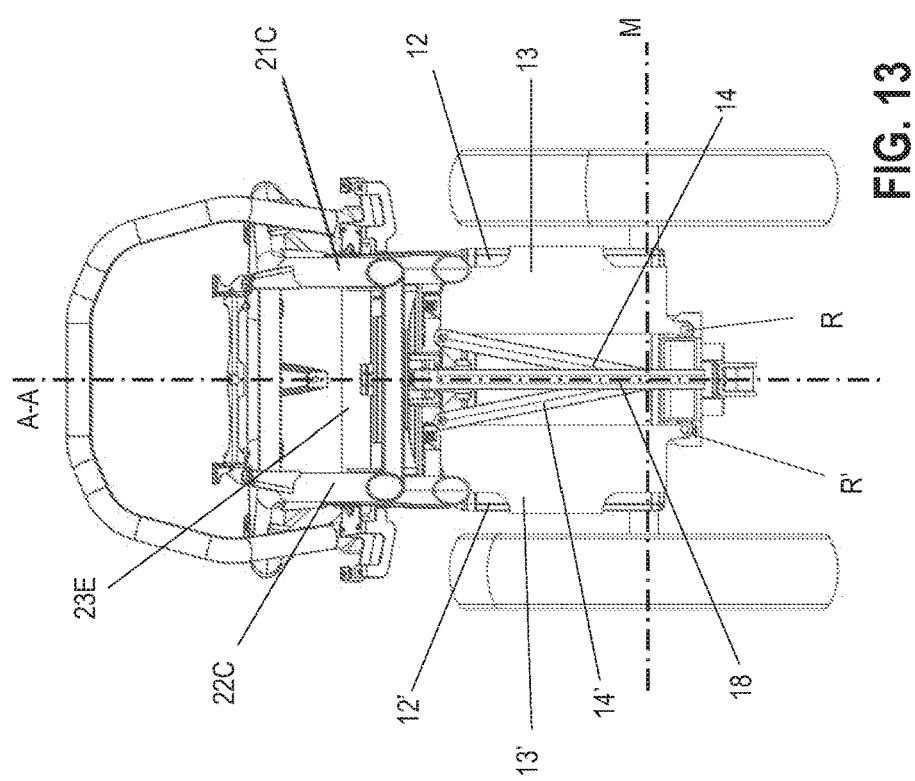
Figure 18:
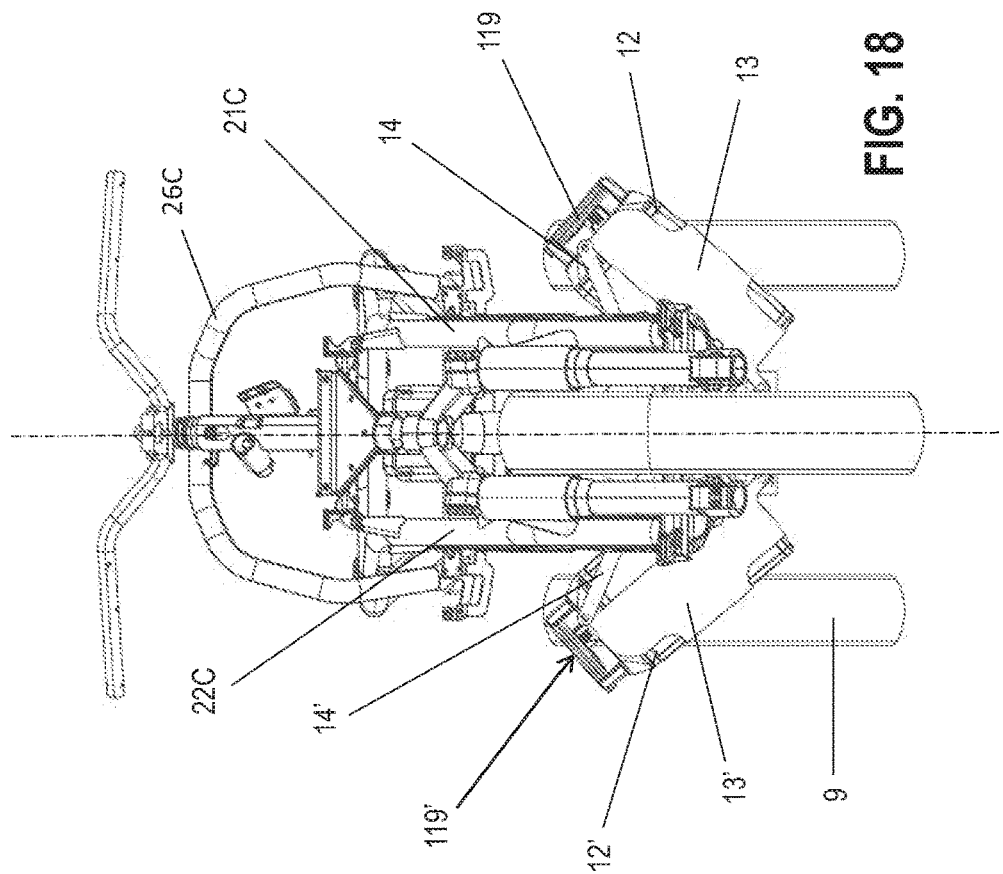
FIGS. 17 and 18 are front views of the vehicle of FIGS. 11 and 12 in a first configuration and in a second configuration of the vehicle, respectively.
Figure 17:
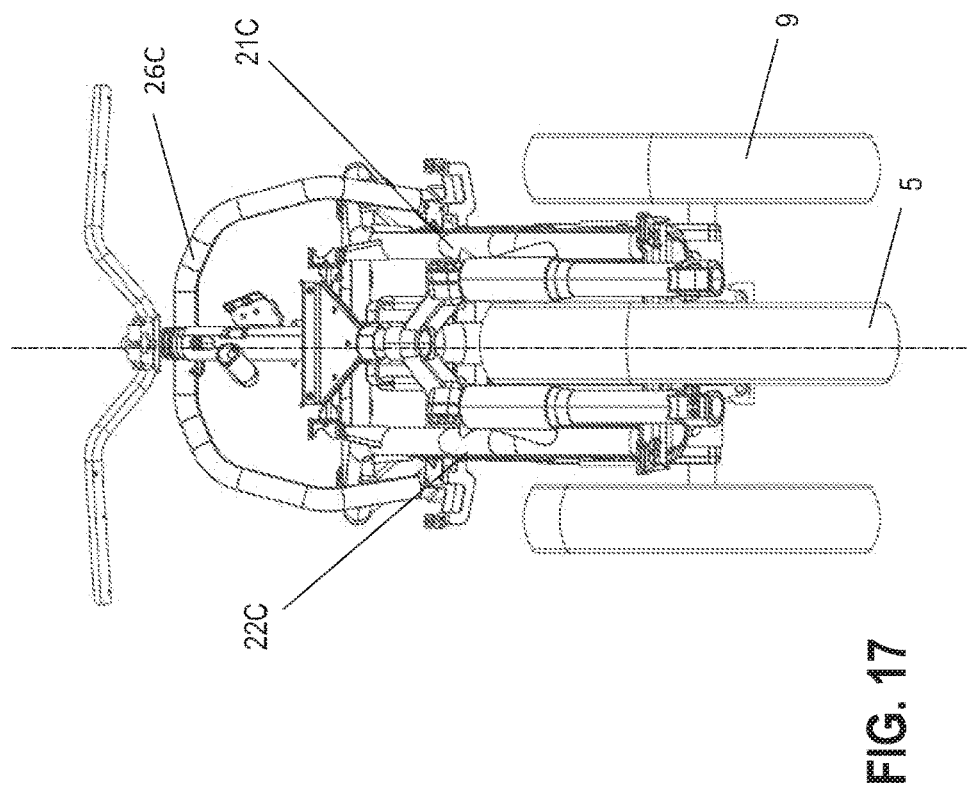

As can be easily seen in FIGS. 14 and 15, the pin 15 moves along a worm screw 18 that acts as a guide for the same. The pin 15, translating downward on this screw 18 causes closing of the levers 14, 14' so as to move the supports 13, 13' to the retracted position, i.e., in an arrangement such that they are parallel to the longitudinal center plane A-A, in specular position thereto. The upward translation of the pin 15, again determined by the actuator 77, causes opening of the levers 14, 14' that in turn move the supports 13, 13' to the extended position. As can be seen from FIGS. 12 and 18, in this position these supports 13, 13' are oblique with respect to the longitudinal center plane A-A and their upper end is exposed and hence easily accessible. In this position extraction and repositioning of the batteries 12, 12' is very simple, in accordance with the objects of the invention.

The actuator 77 could be of any known type, such as for example electric, electrostatic, electromagnetic or hydraulic. Nonetheless, according to preferred embodiments, it is of electric type and is operated by the service battery 17, preferably the same used for starting the vehicle 1.

In the embodiment shown in the figures, the actuator 77 controls both the movement from the retracted position to the extended position and the opposite movement (from the extended position to the retracted position). Nonetheless, an actuator configured to ensure only the opening movement of the supports 13, 13' (from the retracted position to the extended position) could be used, while the opposite closing movement could be performed manually. Alternatively, an actuator could be provided to control the closing movement (from the extended position to the retracted position), while opening could be implemented by means of the force of gravity according to a principle similar to the one described above for the solution shown in FIGS. 1 to 10. In this regard, also in this case this could be safety means such as those described previously (levers L1, L2) or other functionally equivalent means.

Also in this second embodiment, the moving means can comprise damper elements (not illustrated in FIGS. 11 to 18) suitable to control the speed of rotation of the supports 13, 13'. In particular, these damper elements are useful in the case in which the actuator 77 is configured to act only during closing, i.e., to actuate the movement towards the retracted position, while the opposite movement is actuated through gravity.

In any case, for any possible configuration thereof, the actuator 77 is controlled by a control means positioned, advantageously, at the front-end part 3, preferably on the handlebar or on the rear-shield. Nonetheless, this control means could also be positioned elsewhere, for example in the saddle compartment.

With reference once again to FIGS. 11 to 18, in this second embodiment, also the rear part 2C of the frame 2 is partly different from the one shown in FIGS. 1 to 10. In particular, it is different the configuration of the lateral portions 711, 712 of the battery-holder frame, in which a pair of lateral portions 711, 712 can still be found, each of which extends below a corresponding side 21C, 22C having at least one rectilinear length extending in longitudinal direction orthogonally to the center plane (considering the vehicle unloaded and resting on a horizontal plane PO). A corresponding support 13, 13' of a battery 12, 12' is hinged to this rectilinear length to configure the axes of rotation R, R'.

As can be seen for example from the figures, the rear portion 2C also comprises a central element 29 that extends astride the center plane A-A and to which the two lateral portions 711, 712 of the frame 2 are connected at the rear. These are also connected above and at the front to the corresponding sides 21C, 22C. The fork 99 is connected to the rear end of the central element 29 as can be seen in FIG. 15 in which the axis of rotation X of the fork itself is indicated. Uprights 24A, 24B (indicated in FIG. 16) are arranged between the central element 29 and the transverse elements 23D, 23E of the rear portion 2C of the frame to space the sides 21C, 22C from the central element 29 itself at the top. As can be seen in FIG. 16, a shock absorber 44 is arranged between a rear upright 24B and the fork 99. A front upright 24A is instead arranged in a position proximal to the central portion 2B of the frame 2. In FIG. 16, the supports 13, 13' are not shown in order to highlight the structure of their moving means.

With regard to the other parts of the motor vehicle 1, such as the powertrain 110, the charger unit of the batteries 12, 12' and/or the control unit 59 of the electric motor 111, the description provided above for the first embodiment should be considered valid.

In the embodiments described and as can be seen in the figures, the batteries 12, 12' and the respective supports 13, 13' are preferably positioned at the rear-end part 6, interposed between said saddle 7 and said driving wheel 9. Nonetheless, depending on the configuration of the frame 2 and in general of the motor vehicle 1, they could also be positioned in another position, for example arranged at the intermediate part 10 under the footboard.

In any case, and regardless of the embodiment of the motor vehicle 1, the batteries 12, 12' are preferably provided with a gripping means 119, 119' suitable to simplify their extraction from the respective support 13, 13'.

Preferably, a removable locking strap 114, 114' is provided for each battery 12, 12', the ends of which can be fixed to opposite walls of the relative support 13, 13'. Each strap 114, 114', is fixed so as to act on the upper surface of the battery 12, 12' to exert a force that stabilizes housing of the latter in the relative support 13, 13'.

In all the embodiments described and shown, the control unit 59 comprises a plurality of electric/electronic components arranged inside a metal container. In the case in which the powertrain 110 is of hybrid type, traction is ensured by the energy stored in the batteries 12, 12' that power the electric motor 111, and which can be charged both by connecting them to an electrical power source and/or to a specific mains power supply with a standard socket, and by means of a motor generator, i.e. an endothermic motor, which operates an electric generator arranged to charge the batteries 12, 12' and/or to power the powertrain 110. Moreover, it is possible to provide an intermediate solution in which a part of the electrical energy produced by the electric generator is used for traction in a direct way and another part is instead used to increase the charge available in the batteries 12, 12'.

In the presence of a 220 V power socket, for example in one's garage, the batteries 12, 12' can be charged even without being removed. This operation can be implemented through the aforesaid charger unit 51 placed below the saddle 7 and using an electrical cable provided at the end with an electrical connection 52 (socket). When not in use, this remains positioned in a specific seat defined in the saddle compartment. Preferably, when the socket is still in use, for example because it is connected to the mains power network or if it has been disconnected but not yet repositioned in its seat, starting of the vehicle 1 is inhibited by the control unit 59. Instead, if the socket is in its seat, it is possible to close the saddle 7 completely, allowing starting of the vehicle 1 in safe conditions. In this configuration, the cable is contained entirely in its housing, which has a shape that adapts to the space available at a rear wall of the helmet compartment.

A possible mode of operating of a driver of a motor vehicle 1 in the second embodiment described, and when the batteries 12, 12' are partly or completely low, will now be described. After having determined that charging is necessary, through a suitable indicator means, and after having stopped the travel, the driver operates the control means, for example by pressing a push button located on the handlebar 17, or by operating a lever. The control means activates the actuator 77 which moves the supports 13, 13' towards the extended position. Upon reaching this position, the batteries 12, 12' are easily accessible and the driver can extract them by simply using the relative gripping means 119, 119'. This operation does not require any tools and does not pose any risk of soiling or injuring. After charging has terminated, the driver inserts the batteries 12, 12' into the relative supports 13, 13' and, through the control means, causes rotation of the supports 13, 13' towards the retracted position allowing the vehicle 1 to once again optimize its aerodynamic configuration for travel.

In the case in which the moving means is configured according to the first embodiment described above, the movement of the supports towards the extracted position takes place following activation of the uncoupling system that releases rotation of the batteries. This rotation is ensured by the safety means (levers L1, L2) indicated above, but could also take place through gravity alone. In this case, the return of the supports 13, 13' to the retracted position takes place through a manual intervention of the driver.

As shown, the technical solutions described above allow the aims and the objects set to be fully achieved. In particular, the positioning of the batteries 12, 12' and of the relative supports 13, 13', together with the mobility of the supports 13, 13' and the presence of the relative moving means, achieves simple and rapid operations for removal and installation of the batteries 12, 12', while ensuring suitable autonomy of travel and reduced dimensions of the vehicle 1.

The saddle-riding type vehicle 1 thus conceived is susceptible to numerous possible variants, all falling within the scope of the present invention. In this regard, in a possible variant, the motor vehicle could comprise a coupling system 8 like the one shown in the first embodiment and simultaneously also an actuator means 77 to carry out rotation of the supports 13, 13' in the two directions after the coupling/uncoupling system releases them in the retracted position.

In general, the materials used as well as the dimensions and contingent forms can be any according to the needs and to the state of the art.

The invention claimed is:

1. A saddle-riding type vehicle comprising:
   a frame extending mainly along a longitudinal direction and comprising a front portion, a central portion, and a rear portion;
   the front portion supporting a front-end part that comprises a steering assembly pivotably connected to the front portion of the frame to control at least one steered wheel of the vehicle;
   the rear portion supporting a rear-end part that comprises a saddle and at least one driving wheel arranged below the saddle;
   the central portion supporting an intermediate part connecting the front-end part to the rear-end part;
   a powertrain connected to the frame and comprising at least one electric motor operatively connected to the at least one driving wheel;
   an electrical power supply assembly configured to power the electric motor for traction of the vehicle and comprising at least one first pair of batteries arranged on opposite sides with respect to a longitudinal center plane of the vehicle, orthogonal to the axis of rotation of the at least one driving wheel;
   wherein each battery is supported by a corresponding first support or second support, each of the first support and second support movable between a retracted position and an extended position; and
   moving means for causing simultaneous rotation of the first support and second support around a corresponding axis of rotation so that the first support and the second support occupy the retracted position or the extended position.

2. The vehicle of claim 1, wherein the moving means comprises:
   a pair of levers, each lever having a first end engaged with a corresponding support and a second end fixed to a common pin; and
   an actuator acting on the common pin to determine the movement of the levers.

3. The vehicle of claim 1, wherein the first support and the second support are rotatable around respective axes of rotation parallel to the center plane.

4. The vehicle of claim 1, wherein the axes of rotation are inclined with respect to a support plane of the vehicle.

5. The vehicle of claim 4, wherein the axes of rotation are orthogonal to the axis of rotation of the at least one driving wheel.

6. The vehicle of claim 1, wherein the pin is vertically movable on the center plane of the vehicle via the actuator which, by controlling upward or downward translation of the pin, determines a movement towards the extended position or towards the retracted position of the first and second supports, respectively.

7. The vehicle of claim 1, wherein the moving means comprises at least one first coupling element that removably engages with a second coupling element integral with at least one of the first and second supports to lock the respective at least one support in the retracted position, wherein following disengagement of the first and second coupling elements the at least one of the first and second supports is free to rotate about the corresponding axis of rotation to reach the extended position.

8. The vehicle of claim 7, each of the batteries comprising a first coupling element associated with the frame and a second coupling element integral with a corresponding one of the first and second supports, wherein each first coupling element removably engages with a corresponding second coupling element to lock the corresponding support in the retracted position.

9. The vehicle of claim 8, comprising a control unit configured to determine disengagement of each first coupling element from the corresponding second coupling element.

10. The vehicle of claim 9, wherein the control unit is configured to selectively intervene on the first coupling elements to uncouple one of the first and second supports independently from the other of the first and second supports.

11. The vehicle of claim 9, wherein the control unit is configured to simultaneously intervene on the first coupling elements to simultaneously uncouple the first and second supports.

12. The vehicle of claim 1, comprising safety means for guiding movement of the first and second supports from the retracted position to the extended position.

13. The vehicle of claim 12, wherein the safety means further exert a locking action to stabilize each battery inside the corresponding first or second support during forward travel of the vehicle.

14. The vehicle of claim 1, wherein the moving means comprises damper elements configured to control a speed of rotation of the first and second supports.

15. The vehicle of claim 1, wherein the batteries and the respective first and second supports are positioned at the rear-end part and supported by a battery-holder frame connected to the rear portion of the frame.

* * * * *